US012764457B2

(12) United States Patent
Zhang

(10) Patent No.: US 12,764,457 B2
(45) Date of Patent: Oct. 13, 2026

(54) DIRECTIONAL MICROPHONE MODULE

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC ACOUSTIC TECHNOLOGIES (SHENZHEN) CO., LTD., Shenzhen (CN)

(*) Notice: Subject to any disclaimer, the term of this patent is extended or adjusted under 35 U.S.C. 154(b) by 160 days.

(21) Appl. No.: 18/755,639

(22) Filed: Jun. 26, 2024

(65) Prior Publication Data

US 2025/0274700 A1 Aug. 28, 2025

Related U.S. Application Data

(63) Continuation of application No. PCT/CN2024/078470, filed on Feb. 26, 2024.

(51) Int. Cl.
*H04R 1/32* (2006.01)

(52) U.S. Cl.
CPC ....... *H04R 1/326* (2013.01); *H04R 2201/003* (2013.01)

(58) Field of Classification Search
CPC .... H04R 1/326; H04R 2201/003; H04R 1/02; H04R 1/023; H04R 2201/02
See application file for complete search history.

(56) References Cited

U.S. PATENT DOCUMENTS

2011/0158450 A1* 6/2011 Tanaka .................... H04R 1/38 381/355
2012/0328142 A1* 12/2012 Horibe .................. H04R 3/005 381/355
2019/0145806 A1* 5/2019 Lim ..................... G01L 9/0073 73/861.27

FOREIGN PATENT DOCUMENTS

CN 101296531 A * 10/2008
CN 206524970 U * 9/2017
CN 110753293 A * 2/2020 ............ H04R 19/04

(Continued)

OTHER PUBLICATIONS

English machine translation of CN-206524970-U (Zhang, Jinyu; MEMS (Micro-electromechanical system) microphone; published Sep. 2017) (Year: 2017).*

(Continued)

*Primary Examiner* — Mark Fischer
(74) *Attorney, Agent, or Firm* — Wiersch Law Group

(57) ABSTRACT

A directional microphone module is disclosed. The directional microphone module includes a sound-permeable mesh, a housing having a top wall and a side wall, a circuit board, and a MEMS microphone fixed to the circuit board. The circuit board and the top wall are spaced for forming a first cavity. The circuit board and the sound-permeable mesh are spaced for forming a second cavity. The two cavities are only communicated at a side, and the MEMS microphone locates at an opposite side. The MEMS microphone includes two acoustic holes, the first one faces the top wall and communicates with the first cavity, the second one faces the circuit board and communicates with the second cavity through a through hole of the circuit board. The directional microphone module can always work stably and has a simple structure, and also can improve the production efficiency and reduce the labor cost.

9 Claims, 3 Drawing Sheets

(56) References Cited

FOREIGN PATENT DOCUMENTS

| | | | | | |
|---|---|---|---|---|---|
| CN | 215871839 U | * | 2/2022 | | |
| WO | WO-2007123300 A1 | * | 11/2007 | ............... | H04R 1/04 |

OTHER PUBLICATIONS

English machine translation of CN-110753293-A (Wei et al.; MEMS microphone, preparation method and electronic device; published Feb. 2020) (Year: 2020).*

English machine translation of CN-215871839-U (Wang et I.; Microphone; published Feb. 2022) (Year: 2022).*

* cited by examiner

DIRECTIONAL MICROPHONE MODULE

FIELD OF THE PRESENT DISCLOSURE

The present disclosure relates to acoustoelectric transducers, in particular to a directional microphone module.

DESCRIPTION OF THE RELATED ART

A traditional directional microphone module in the related art typically uses a built-in pressure gradient electret microphone to achieve directivity.

However, since the performance of the pressure gradient electret microphone decays with the work time, the traditional directional microphone module cannot work stably for a long time, as a result, the traditional directional microphone module cannot be used in the scenario that needs to continuously work for a long time. Besides, assembling the pressure gradient electret microphone requires manual welding in addition to using surface mounting technology (SMT), as a result, the traditional directional microphone module has the low production efficiency and high labor cost.

Thus, it is necessary to provide a novel directional microphone module to solve the problems.

SUMMARY

An objective of the present disclosure is to overcome the above problems and provide a directional microphone module which can always work stably and has a simple structure, and also can improve the production efficiency and reduce the labor cost.

In order to achieve the objective mentioned above, the present disclosure discloses a directional microphone module including a sound-permeable mesh, a housing engaged with the sound-permeable mesh for forming a containing space, a circuit board disposed in the containing space and fixed to the housing, and a MEMS microphone disposed in the containing space and fixed to the circuit board. The housing includes a top wall spaced apart from the sound-permeable mesh and a side wall extending from the top wall and fixed to the sound-permeable mesh. The circuit board is arranged between the top wall and the sound-permeable mesh. The circuit board and the top wall are spaced for forming a first cavity. The circuit board and the sound-permeable mesh are spaced for forming a second cavity. The side wall includes two first walls disposed opposite to each other and two second walls disposed opposite to each other and connecting the two first walls. The first cavity and the second cavity are only communicated at a position adjacent to one of the two second walls. The MEMS microphone is disposed in the first cavity and locates at a position adjacent to another second wall. The MEMS microphone includes a first acoustic hole facing the top wall and a second acoustic hole facing the circuit board. The first acoustic hole communicates with the first cavity. The circuit board is provided with a through hole communicating the second acoustic hole and the second cavity. The second acoustic hole communicates with the second cavity through the through hole.

As an improvement, the directional microphone module has a long axis and a short axis perpendicular to the long axis. The two first walls extend along the long axis. The two second walls extend along the short axis. In a direction along the long axis, the circuit board is spaced apart from the one of the two second walls.

As an improvement, the top wall, the circuit board and the sound-permeable mesh are parallel to each other. A spaced distance between the circuit board and the top wall is equal to a spaced distance between the circuit board and the sound-permeable mesh.

As an improvement, the second acoustic hole is closer to the another second wall than the first acoustic hole.

As an improvement, the housing is provided with a step part extending from the top wall toward the sound-permeable mesh and only along the two first walls and the another second wall. The circuit board is fixed to the step part.

As an improvement, the first acoustic hole, the second acoustic hole and the through hole are circular holes. A hole center of the second acoustic hole and a hole center of the through hole are in a straight line.

As an improvement, a hole diameter of the through hole is larger than a hole diameter of the second acoustic hole.

As an improvement, the first acoustic hole, the second acoustic hole and the through hole are arranged at an intermediate position between the two first walls.

As an improvement, the MEMS microphone is fixed to the circuit board by using surface mounting technology.

In the directional microphone module according to the present disclosure, the MEMS microphone with double-sided acoustic holes cooperates with the housing, the sound-permeable mesh and the circuit board to achieve directivity, so as to make the overall structure simple. In addition, since the MEMS microphone can always work stably, the directional microphone module can be used in the scenario that needs to continuously work for a long time. Furthermore, since assembling the MEMS microphone can directly use surface mounting technology without manual welding, the directional microphone module can improve the production efficiency and reduce the labor cost.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
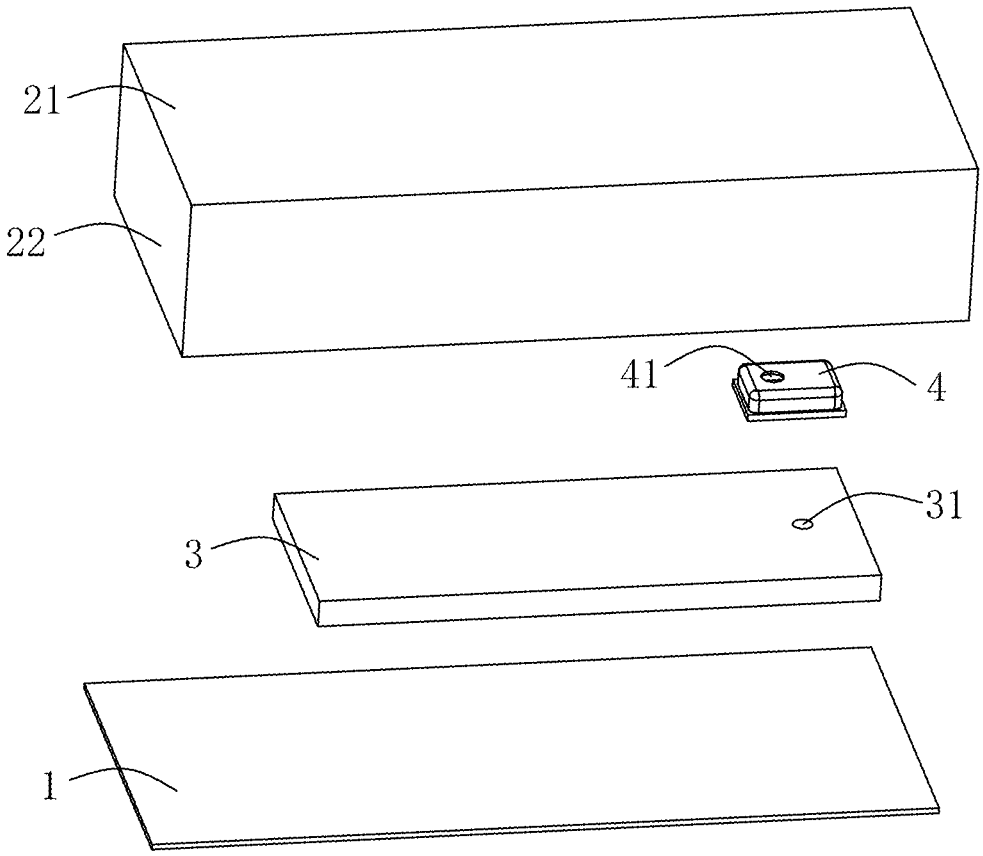
FIG. 1 is an exploded view of the directional microphone module of the present disclosure.
Figure 2:
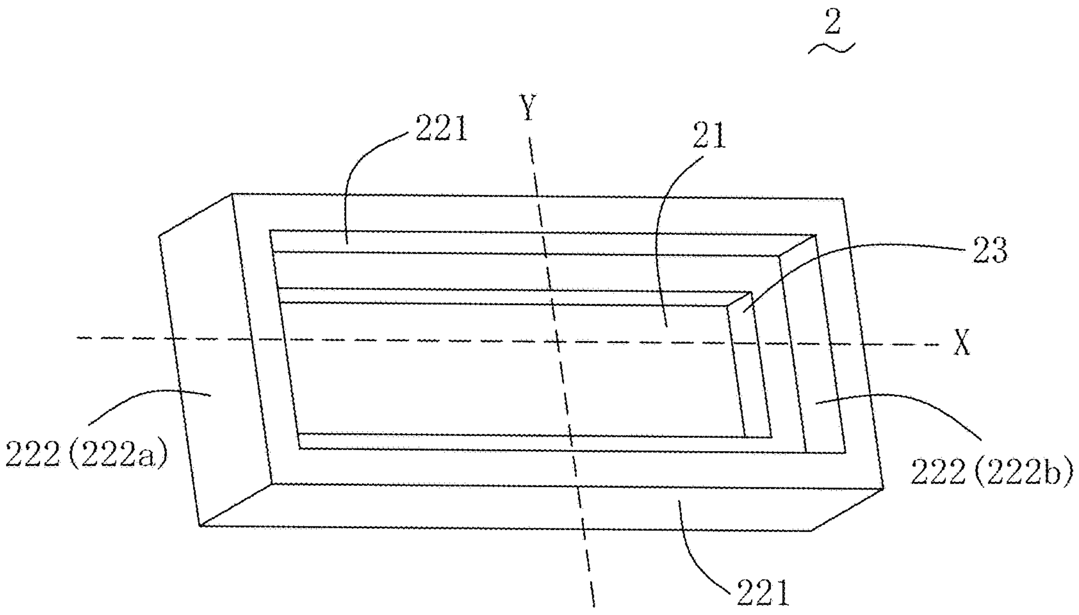
FIG. 2 is an isometric view of a housing of the directional microphone module of the present disclosure.
Figure 3:
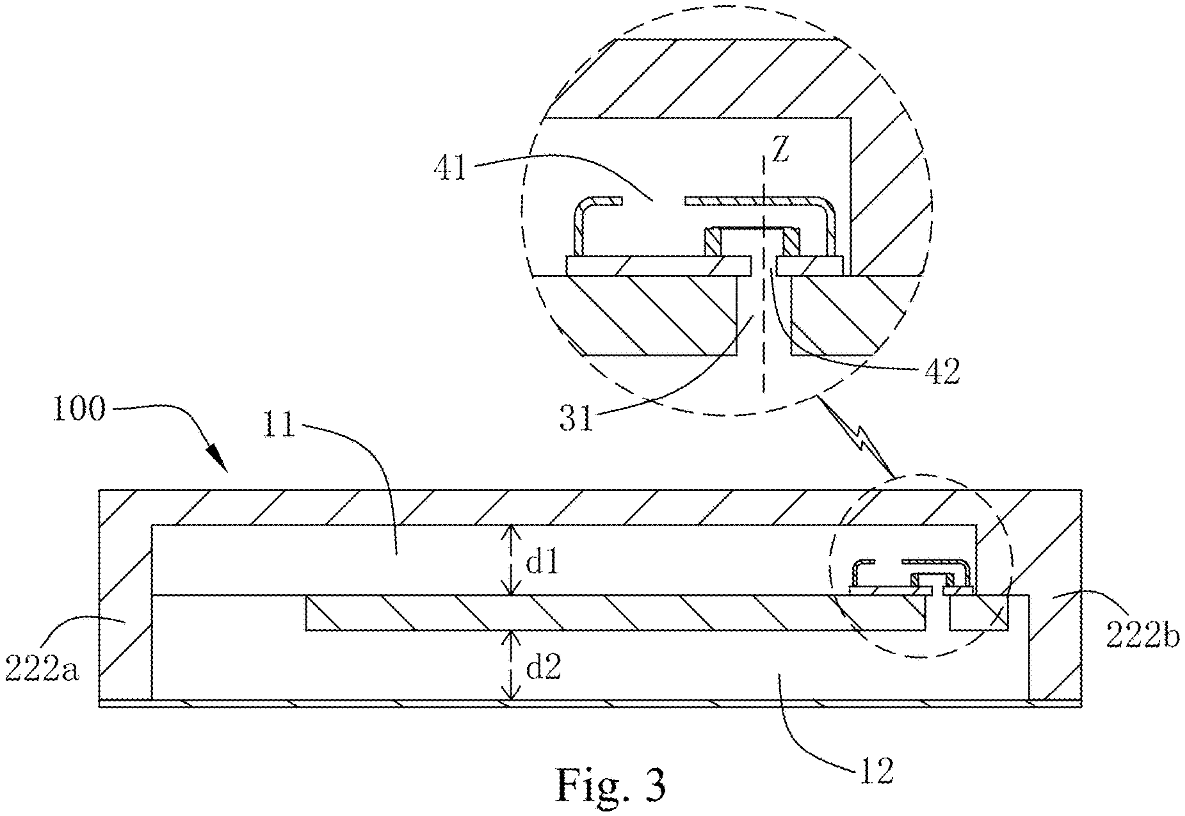
FIG. 3 is a cross-sectional view of the directional microphone module of the present disclosure.

Referring to FIGS. 1-3, the present disclosure discloses a directional microphone module 100. The directional microphone module 100 includes a sound-permeable mesh 1, a housing 2 engaged with the sound-permeable mesh 1 for forming a containing space, a circuit board 3 disposed in the containing space and fixed to the housing 2, and a MEMS microphone 4 disposed in the containing space and fixed to the circuit board 3.

The MEMS microphone 4 is fixed to the circuit board 3 by using surface mounting technology.

The housing 2 includes a top wall 21 spaced apart from the sound-permeable mesh 1 and a side wall 22 extending from the top wall 21 and fixed to the sound-permeable mesh 1.

The circuit board 3 is arranged between the top wall 21 and the sound-permeable mesh 1. The circuit board 3 and the top wall 21 are spaced for forming a first cavity 11. The circuit board 3 and the sound-permeable mesh 1 are spaced for forming a second cavity 12.

The side wall 22 includes two first walls 221 disposed opposite to each other and two second walls 222 disposed opposite to each other and connecting the two first walls 221. The directional microphone module 100 has a long axis X and a short axis Y perpendicular to the long axis X. The two first walls 221 extend along the long axis X. The two second walls 222 extend along the short axis Y.

The first cavity 11 and the second cavity 12 are only communicated at a position adjacent to one wall 222*a* of the two second walls 222. The MEMS microphone 4 is disposed in the first cavity 11 and locates at a position adjacent to another wall 222*b* of the two second walls 222. In a direction along the long axis X, the circuit board 3 is spaced apart from the one wall 222*a* of the two second walls 222.

The MEMS microphone 4 includes a first acoustic hole 41 facing the top wall 21 and a second acoustic hole 42 facing the circuit board 3. The first acoustic hole 41 communicates with the first cavity 11. The circuit board 3 is provided with a through hole 31 communicating the second acoustic hole 42 and the second cavity 12. The second acoustic hole 42 communicates with the second cavity 12 through the through hole 31.

The housing 2 is provided with a step part 23 extending from the top wall 21 toward the sound-permeable mesh 1 and only along the two first walls 221 and the another wall 222*b* of the two second walls 222. The circuit board 3 is fixed to the step part 23.

The top wall 21, the circuit board 3 and the sound-permeable mesh 1 are parallel to each other. A spaced distance d1 between the circuit board 3 and the top wall 21 is equal to a spaced distance d2 between the circuit board 3 and the sound-permeable mesh 1.

The second acoustic hole 42 is closer to the another wall 222*b* of the two second walls 222 than the first acoustic hole 41.

The first acoustic hole 41, the second acoustic hole 42 and the through hole 31 are circular holes. A hole center of the second acoustic hole 42 and a hole center of the through hole 31 are in a straight line Z.

A hole diameter of the through hole 31 is larger than a hole diameter of the second acoustic hole 42.

The first acoustic hole 41, the second acoustic hole 42 and the through hole 31 are arranged at an intermediate position between the two first walls 221.

Figure 4:
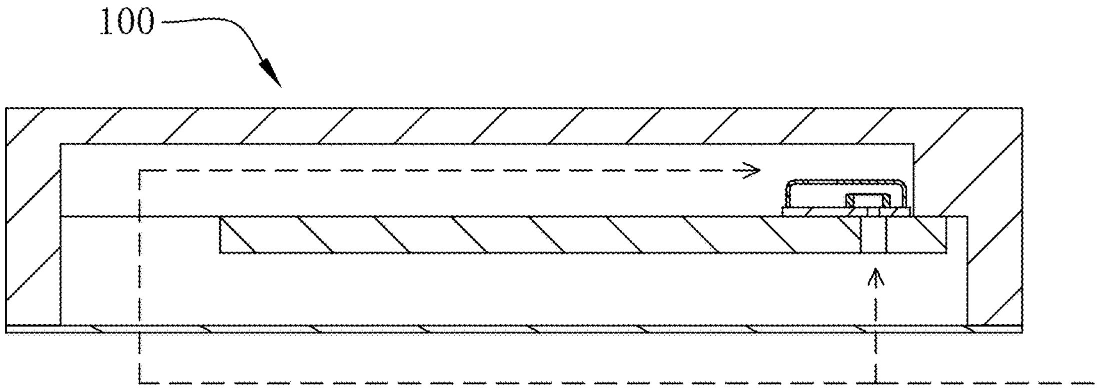
FIG. 4 is a sound transmission path diagram of the directional microphone module of the present disclosure, receiving sounds coming from the first direction.
Figure 5:
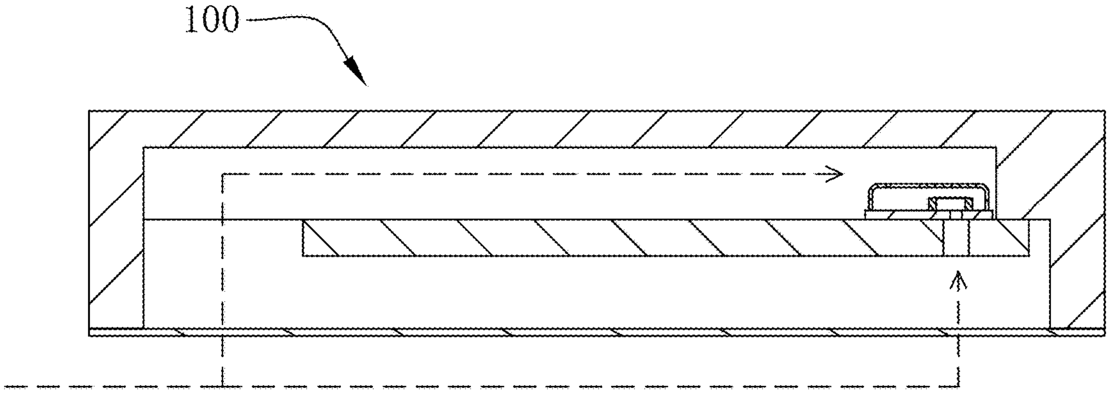
FIG. 5 is a sound transmission path diagram of the directional microphone module of the present disclosure, receiving sounds coming from the second direction.

Referring to FIGS. 4-5, FIG. 4 is a sound transmission path diagram of the directional microphone module 100 receiving sounds coming from the first direction. Sounds coming from the first direction transmit in two transmission paths shown by the dotted lines in FIG. 4 and enter the MEMS microphone 4 through the first acoustic hole 41 and the second acoustic hole 42 respectively. Since the length of one transmission path through the first acoustic hole 41 is longer and the length of another transmission path through the second acoustic hole 42 is shorter, the sound signals on both sides form a differential pressure signal. FIG. 5 is a sound transmission path diagram of the directional microphone module 100 receiving sounds coming from the second direction. Sounds coming from the second direction transmit in two transmission paths shown by the dotted lines in FIG. 5 and enter the MEMS microphone 4 through the first acoustic hole 41 and the second acoustic hole 42 respectively. Since the length of one transmission path through the first acoustic hole 41 is approximately equal to the length of another transmission path through the second acoustic hole 42, the sound signals on both sides counteract each other. Thus, the directional microphone module 100 achieves directivity.

In the directional microphone module 100 according to the present disclosure, the MEMS microphone 4 with double-sided acoustic holes cooperates with the housing 2, the sound-permeable mesh 1 and the circuit board 3 to achieve directivity, so as to make the overall structure simple. In addition, since the MEMS microphone 4 can always work stably, the directional microphone module 100 can be used in the scenario that needs to continuously work for a long time. Furthermore, since assembling the MEMS microphone 4 can directly use surface mounting technology without manual welding, the directional microphone module 100 can improve the production efficiency and reduce the labor cost.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A directional microphone module, comprising:

a sound-permeable mesh;

a housing, engaged with the sound-permeable mesh for forming a containing space;

a circuit board, disposed in the containing space and fixed to the housing; and a MEMS microphone, disposed in the containing space and fixed to the circuit board, wherein the housing comprises a top wall spaced apart from the sound-permeable mesh and a side wall extending from the top wall and fixed to the sound-permeable mesh, the circuit board is arranged between the top wall and the sound-permeable mesh, the circuit board and the top wall are spaced for forming a first cavity, the circuit board and the sound-permeable mesh are spaced for forming a second cavity, the side wall comprises two first walls disposed opposite to each other and two second walls disposed opposite to each other and connecting the two first walls, the first cavity and the second cavity are only communicated at a position adjacent to one of the two second walls, the MEMS microphone is disposed in the first cavity and locates at a position adjacent to another second wall, the MEMS microphone comprises a first acoustic hole facing the top wall and a second acoustic hole facing the circuit board, the first acoustic hole communicates with the first cavity, the circuit board is provided with a through hole communicating the second acoustic hole and the second cavity, the second acoustic hole communicates with the second cavity through the through hole, and wherein the housing is provided with a step part extending from the top wall toward the sound-permeable mesh and only along the two first walls and the another second wall, the circuit board is fixed to the step part.

2. The directional microphone module as described in claim 1, having a long axis and a short axis perpendicular to the long axis, wherein the two first walls extend along the long axis, the two second walls extend along the short axis, in a direction along the long axis, the circuit board is spaced apart from the one of the two second walls.

3. The directional microphone module as described in claim 1, wherein the top wall, the circuit board and the sound-permeable mesh are parallel to each other, a spaced distance between the circuit board and the top wall is equal to a spaced distance between the circuit board and the sound-permeable mesh.

4. The directional microphone module as described in claim 1, wherein the second acoustic hole is closer to the another second wall than the first acoustic hole.

5. The directional microphone module as described in claim 1, wherein the first acoustic hole, the second acoustic hole and the through hole are circular holes, a hole center of the second acoustic hole and a hole center of the through hole are in a straight line.

6. The directional microphone module as described in claim 5, wherein a hole diameter of the through hole is larger than a hole diameter of the second acoustic hole.

7. The directional microphone module as described in claim 1, wherein the first acoustic hole, the second acoustic hole and the through hole are arranged at an intermediate position between the two first walls.

8. The directional microphone module as described in claim 1, wherein the MEMS microphone is fixed to the circuit board by using surface mounting technology.

9. A directional microphone module, comprising:

a sound-permeable mesh;

a housing, engaged with the sound-permeable mesh for forming a containing space;

a circuit board, disposed in the containing space and fixed to the housing; and a MEMS microphone, disposed in the containing space and fixed to the circuit board, wherein the housing comprises a top wall spaced apart from the sound-permeable mesh and a side wall extending from the top wall and fixed to the sound-permeable mesh, the circuit board is arranged between the top wall and the sound-permeable mesh, the circuit board and the top wall are spaced for forming a first cavity, the circuit board and the sound-permeable mesh are spaced for forming a second cavity, the side wall comprises two first walls disposed opposite to each other and two second walls disposed opposite to each other and connecting the two first walls, the first cavity and the second cavity are only communicated at a position adjacent to one of the two second walls, the MEMS microphone is disposed in the first cavity and locates at a position adjacent to another second wall, the MEMS microphone comprises a first acoustic hole facing the top wall and a second acoustic hole facing the circuit board, the first acoustic hole communicates with the first cavity, the circuit board is provided with a through hole communicating the second acoustic hole and the second cavity, the second acoustic hole communicates with the second cavity through the through hole, and wherein the top wall, the circuit board and the sound-permeable mesh are parallel to each other, a spaced distance between the circuit board and the top wall is equal to a spaced distance between the circuit board and the sound-permeable mesh.

* * * * *